United States Patent
Kim et al.

(10) Patent No.: US 12,150,148 B2
(45) Date of Patent: Nov. 19, 2024

(54) METHOD FOR PERFORMING SIDELINK COMMUNICATION, AND DEVICE THEREFOR

(71) Applicant: IUCF-HYU (INDUSTRY-UNIVERSITY COOPERATION FOUNDATION HANYANG UNIVERSITY), Seoul (KR)

(72) Inventors: Sunwoo Kim, Seoul (KR); Hyeongwook Seo, Seoul (KR); Joohyun Lee, Seoul (KR); Taekyoon Kim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/586,567

(22) Filed: Feb. 26, 2024

(65) Prior Publication Data
US 2024/0205942 A1   Jun. 20, 2024

Related U.S. Application Data

(63) Continuation of application No. PCT/KR2022/014436, filed on Sep. 27, 2022.

(30) Foreign Application Priority Data

Sep. 27, 2021 (KR) .................. 10-2021-0126926
Sep. 26, 2022 (KR) .................. 10-2022-0121299

(51) Int. Cl.
  *H04W 72/25* (2023.01)
  *H04L 5/00* (2006.01)
  *H04W 88/04* (2009.01)

(52) U.S. Cl.
  CPC ........... *H04W 72/25* (2023.01); *H04L 5/0053* (2013.01); *H04W 88/04* (2013.01)

(58) Field of Classification Search
  None
  See application file for complete search history.

(56) References Cited

U.S. PATENT DOCUMENTS

2021/0250954 A1*  8/2021  Li ..................... H04L 1/1854
2022/0286255 A1*  9/2022  Guo .................. H04L 5/006
(Continued)

FOREIGN PATENT DOCUMENTS

EP       3571886 B1     11/2019
KR      20220057449 A    5/2022

OTHER PUBLICATIONS

Moderator (LG Electronics), 'Feature lead summary for AI 8.11.1.2 Inter-UE coordination for Mode 2 enhancements', R1-2108569, 3GPP TSG RAN WG1 Meeting #106-e, Aug. 31, 2021.
(Continued)

*Primary Examiner* — Nguyen H Ngo
(74) *Attorney, Agent, or Firm* — NKL Law; Jae Youn Kim

(57) ABSTRACT

Provided are a method and a device for performing sidelink communication. Provided are a method by which a terminal performs sidelink communication, and a device, the method comprising the steps of: transmitting, to the other terminal, sidelink control information, which includes request information for requesting adjustment information, and indication information for indicating a resource type to be included in the adjustment information; receiving adjustment information from the other terminal; and determining a resource for performing sidelink communication on the basis of the adjustment information and/or resource sensing information.

10 Claims, 11 Drawing Sheets

(56) References Cited

U.S. PATENT DOCUMENTS

| | | | | |
|---|---|---|---|---|
| 2023/0056574 A1* | 2/2023 | Hwang | ............... | H04W 72/25 |
| 2023/0098273 A1* | 3/2023 | Sarkis | ............... | H04L 5/0053 |
| | | | | 370/329 |
| 2024/0015755 A1* | 1/2024 | Pan | ............... | H04W 72/25 |

OTHER PUBLICATIONS

Huawei et al, 'Inter-UE coordination in sidelink resource allocation', R1-2106478, 3GPP TSG RAN WG1 Meeting #106-e, Aug. 7, 2021.

Futurewei, 'Discussion on techniques for inter-UE coordination', R1-2107092, 3GPP TSG RAN WG1 Meeting #106-e, Aug. 6, 2021.

Qualcomm Incorporated, 'Reliability and Latency Enhancements for Mode 2', R1-2108627, 3GPP TSG RAN WG1 Meeting #106-e, Aug. 31, 2021.

* cited by examiner

METHOD FOR PERFORMING SIDELINK COMMUNICATION, AND DEVICE THEREFOR

TECHNICAL FIELD

This disclosure relates to technology for performing sidelink communication.

BACKGROUND ART

There is demand for large-capacity data processing, high-rate data processing, and various services using wireless terminals in vehicles and industrial sites. As described above, there is a need for a technology for a high-rate, large-capacity communication system capable of processing various scenarios and large-volume data, such as video, wireless data, and machine-type communication data, beyond a simple voice-oriented service.

To this end, the ITU-R discloses the requirements for adopting the IMT-2020 international standard, and there is being studied for next-generation wireless communication technology to meet the requirements of IMT-2020.

In particular, the 3GPP is conducting research on the LTE-advanced Pro Rel-15/16 standards and the new radio access technology (NR) standard in parallel to meet the requirements for IMT-2020 called 5G technology, and has a plan to approve the two standards as next-generation wireless communication technology.

5G technology may be applied and utilized in autonomous vehicles. For this, it is necessary to apply 5G technology to vehicle-to-everything (V2X) communication, and autonomous driving requires high-rate transmission and reception while guaranteeing high reliability for increasing data.

Further, to meet driving scenarios of various autonomous vehicles, such as platooning, it is required to ensure multicast data transmission/reception as well as unicast data transmission/reception using V2X communication.

As such, when a plurality of terminals perform sidelink communication using various communication types, there is a risk of conflict of radio resources for sidelink communication. In particular, for communication modes where the base station does not explicitly schedule radio resources, the risk of conflicts due to congestion of radio resources for sidelink communication increases.

DETAILED DESCRIPTION OF THE INVENTION

Technical Problem

The present embodiments may provide a method and device for performing sidelink communication.

Technical Solution

In an aspect, the present embodiments provide a method for performing sidelink communication by a UE, comprising transmitting, to a second UE, sidelink control information including request information for requesting coordination information and indication information indicating a resource type to be included in the coordination information, receiving the coordination information from the second UE, and determining a resource for performing sidelink communication based on at least one of the coordination information and resource sensing information.

In another aspect, the present embodiments provide a UE performing sidelink communication, comprising a transmitter transmitting, to a second UE, sidelink control information including request information for requesting coordination information and indication information indicating a resource type to be included in the coordination information, a receiver receiving the coordination information from the second UE, and a controller determining a resource for performing sidelink communication based on at least one of the coordination information and resource sensing information.

Advantageous Effects

According to the present embodiments, there may be provided a method and device for performing sidelink communication.

MODE FOR CARRYING OUT THE INVENTION

Figure 1:
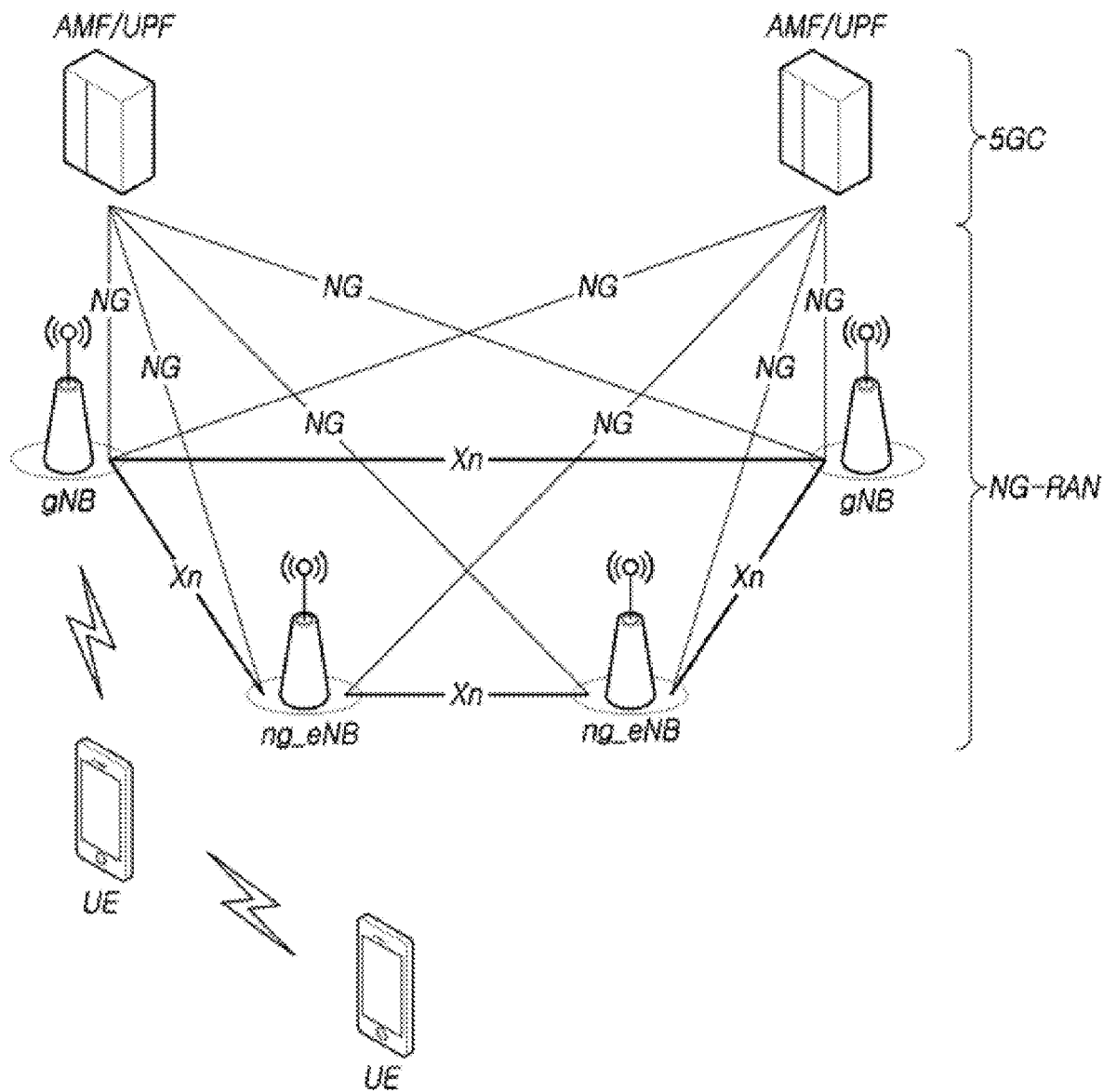
FIG. 1 is a view schematically illustrating a structure for an NR wireless communication system to which the present embodiments may apply.

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. The terms "comprises" and/or "comprising," "has" and/or "having," or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof. As used herein, the singular forms "a", "an" and "the" are intended to include the plural forms as well, unless the context clearly indicates otherwise.

Such denotations as "first," "second," "A," "B," "(a)," and "(b)," may be used in describing the components of the present invention. These denotations are provided merely to distinguish a component from another, and the essence, order, or number of the components are not limited by the denotations.

In describing the positional relationship between components, when two or more components are described as "connected", "coupled" or "linked", the two or more components may be directly "connected", "coupled" or "linked"", or another component may intervene. Here, the other component may be included in one or more of the two or more components that are "connected", "coupled" or "linked" to each other.

When such terms as, e.g., "after", "next to", "after", and "before", are used to describe the temporal flow relationship related to components, operation methods, and fabricating methods, it may include a non-continuous relationship unless the term "immediately" or "directly" is used.

When a component is designated with a value or its corresponding information (e.g., level), the value or the corresponding information may be interpreted as including a tolerance that may arise due to various factors (e.g., process factors, internal or external impacts, or noise).

In the disclosure, 'wireless communication system' means a system for providing various communication services, such as voice and data packets, using a radio resource and may include a UE, a base station, or a core network.

The present embodiments disclosed below may be applied to wireless communication systems using various radio access technologies. For example, the present embodiments may be applied to various radio access technologies, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). Further, radio access technology may mean not only a specific access technology, but also a communication technology for each generation established by various communication organizations, such as 3GPP, 3GPP2, Wi-Fi, Bluetooth, IEEE, and ITU. For example, CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented with a wireless technology, such as institute of electrical and electronic engineers (IEEE) 802.11 (Wi-Fi), IEEE 802.16 (WiMAX), IEEE 802-20, evolved UTRA (E-UTRA), and the like. IEEE 802.16m is an evolution of IEEE 802.16e, and provides backward compatibility with IEEE 802.16e-based systems. UTRA is part of UMTS (universal mobile telecommunications system). 3GPP (3rd generation partnership project) LTE (long term evolution) is part of E-UMTS (evolved UMTS) using evolved-UMTS terrestrial radio access (E-UTRA) and adopts OFDMA for downlink and SC-FDMA for uplink. As such, the present embodiments may be applied to currently disclosed or commercialized radio access technologies and may also be applied to radio access technologies currently under development or to be developed in the future.

Meanwhile, in the disclosure, 'UE' is a comprehensive concept meaning a device including a wireless communication module that communicates with a base station in a wireless communication system and should be interpreted as a concept that may include not only user equipment (UE) in, e.g., WCDMA, LTE, NR, HSPA, and IMT-2020 (5G or new radio), but also a mobile station (MS), user terminal (UT), subscriber station (SS), or wireless device in GSM. Further, the UE may be a user portable device, such as a smartphone, according to the usage type and, in the V2X communication system, the UE may mean a vehicle or a device including a wireless communication module in the vehicle. Further, in the case of a machine type communication system, the UE may mean an MTC terminal, M2M terminal, or URLLC terminal equipped with a communication module to perform machine type communication.

In the disclosure, 'base station' or 'cell' refers to a terminal that communicates with a UE in terms of a network and in concept encompasses various coverage areas, such as node-B, evolved node-B (eNB), gNode-B (gNB), low power node (LPN), sector, site, various types of antennas, base transceiver system (BTS), access point, point (e.g. transmission point, reception point, or transmission/reception point), relay node, mega cell, macro cell, micro cell, pico cell, femto cell, remote radio head (RRH), radio unit (RU), or small cell. Further, 'cell' may mean one including a bandwidth part (BWP) in the frequency domain. For example, 'serving cell' may mean the activation BWP of the UE.

Since there is a base station controlling one or more cells in the various cells enumerated above, the base station may be interpreted in two meanings. The base station may be 1) a device itself which provides a mega cell, a macro cell, a micro cell, a pico cell, a femto cell, or a small cell in relation to the radio region, or 2) the radio region itself. In 1), all devices that provide a predetermined radio region and are controlled by the same entity or interact to configure a radio region via cooperation are denoted as base stations. An embodiment of the base station is a transmission/reception point, transmission point, or reception point depending on the scheme of configuring the radio region. In 2), the radio region itself, in which a signal is received or transmitted from the point of view of the UE or a neighboring base station may be the base station.

In the disclosure, 'cell' may mean the coverage of the signal transmitted from the transmission/reception point, a component carrier having the coverage of the signal transmitted from the transmission/reception point (transmission point or transmission/reception point), or the transmission/reception point itself.

Uplink (UL) means a scheme for transmitting/receiving data to and from the base station by the UE, and downlink (DL) means a scheme for transmitting/receiving data to/from the UE by the base station. Downlink may mean communication or communication path from the multiple transmission/transmission points to the UE, and uplink may mean communication or communication path from the UE to the multiple transmission/reception points. In this case, in the downlink, the transmitter may be part of the multiple transmission/reception points, and the receiver may be part of the UE. Further, in the uplink, the transmitter may be part of the UE, and the receiver may be part of the multiple transmission/reception points.

Uplink and downlink transmits/receives control information through a control channel, such as physical downlink control channel (PDCCH) or physical uplink control channel (PUCCH) and configures a data channel, such as physical downlink shared channel (PDSCH) or physical uplink shared channel (PUSCH) to transmit/receive data. Hereinafter, the context in which signals are transmitted/received through a channel, such as PUCCH, PUSCH, PDCCH, and PDSCH, is expressed as 'transmitting or receiving PUCCH, PUSCH, PDCCH, and PDSCH.'

Although the technical spirit is described focusing primarily on the 3GPP LTE/LTE-A/new RAT (NR) communication system for clarity of description, the technical features are not limited to such communication system.

The 3GPP develops 5th-generation (5G) communication technology to meet the requirements of ITU-R's next-generation radio access technology after research on 4th-generation (4G) communication technology. Specifically, the 3GPP develops new NR communication technology separate from LTE-A pro and 4G communication technology, which have enhanced LTE-advanced technology to meet the requirements of ITU-R, as 5G communication technology. Both LTE-A pro and NR refer to 5G communication technologies. Hereinafter, 5G communication technology is described focusing on NR unless specified as a specific communication technology.

Operating scenarios in NR define various operating scenarios by adding considerations of satellites, automobiles, and new verticals in the existing 4G LTE scenarios and, from a service point of view, supports the enhanced mobile broadband (eMBB) scenario, the massive machine communication (mMTC) scenario that has high UE density but is deployed in a wide range to requires a low data rate and asynchronous access, and the ultra reliability and low latency (URLLC) scenario that requires high responsiveness and reliability and may support high-speed mobility.

To meet such scenarios, NR discloses wireless communication systems that adopt a new waveform and frame structure technology, low-latency technology, ultra-high frequency band (mmWave) supporting technology, and forward compatibility providing technology. In particular, the NR system suggests various technical changes in terms of flexibility to provide forward compatibility. The main technical features of NR are described below with reference to the drawings.

<Overview of NR System>

FIG. 1 is a view schematically illustrating a structure for an NR system to which the present embodiments may apply.

Referring to FIG. 1, the NR system is divided into a 5G core network (5GC) and an NR-RAN part. The NG-RAN is constituted of gNB and ng-eNBs providing user plane (SDAP/PDCP/RLC/MAC/PHY) and user equipment (UE) control plane (RRC) protocol termination. The gNBs or the gNBs and the ng-eNBs are interconnected through the Xn interface. The gNB and the ng-eNB are connected to the 5GC through the NG interface. The 5GC may include an access and mobility management function (AMF) which is in charge of the control plane, such as UE access and mobility control function, and a user plane function (UPF) which is in charge of the user data control function. NR supports both the below-6 GHz frequency band (Frequency Range 1 (FR1) and above-6 GHz frequency band (Frequency Range 2 (FR2)).

The gNB means a base station that provides the UE with NR user plane and control plane protocol termination, and the ng-eNB means a base station that provides the UE with the E-UTRA user plane and control plane protocol termination. In the disclosure, the base station should be understood as encompassing gNB and ng-eNB and, as necessary, be used to separately denote gNB or ng-eNB.

<NR Waveform, Numerology, and Frame Structure>

NR uses the CP-OFDM waveform using the cyclic prefix for downlink transmission and CP-OFDM or DFT-s-OFDM for uplink transmission. OFDM technology is easily combined with multiple input multiple output (MIMO) and has the advantages of high frequency efficiency and capability of using a low-complexity receiver.

Meanwhile, since, in NR, the above-described three scenarios have different requirements for data rate, latency, and coverage, it is needed to efficiently meet the requirements for each scenario through the frequency band constituting any NR system. To that end, there has been proposed technology for efficiently multiplexing radio resources based on a plurality of different numerologies.

Specifically, the NR transmission numerology is determined based on the subcarrier spacing and cyclic prefix (CP) and, as shown in Table 1 below, it is exponentially changed, with the exponent value of 2 used as u with respect to 15 kHz.

TABLE 1

| μ | subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
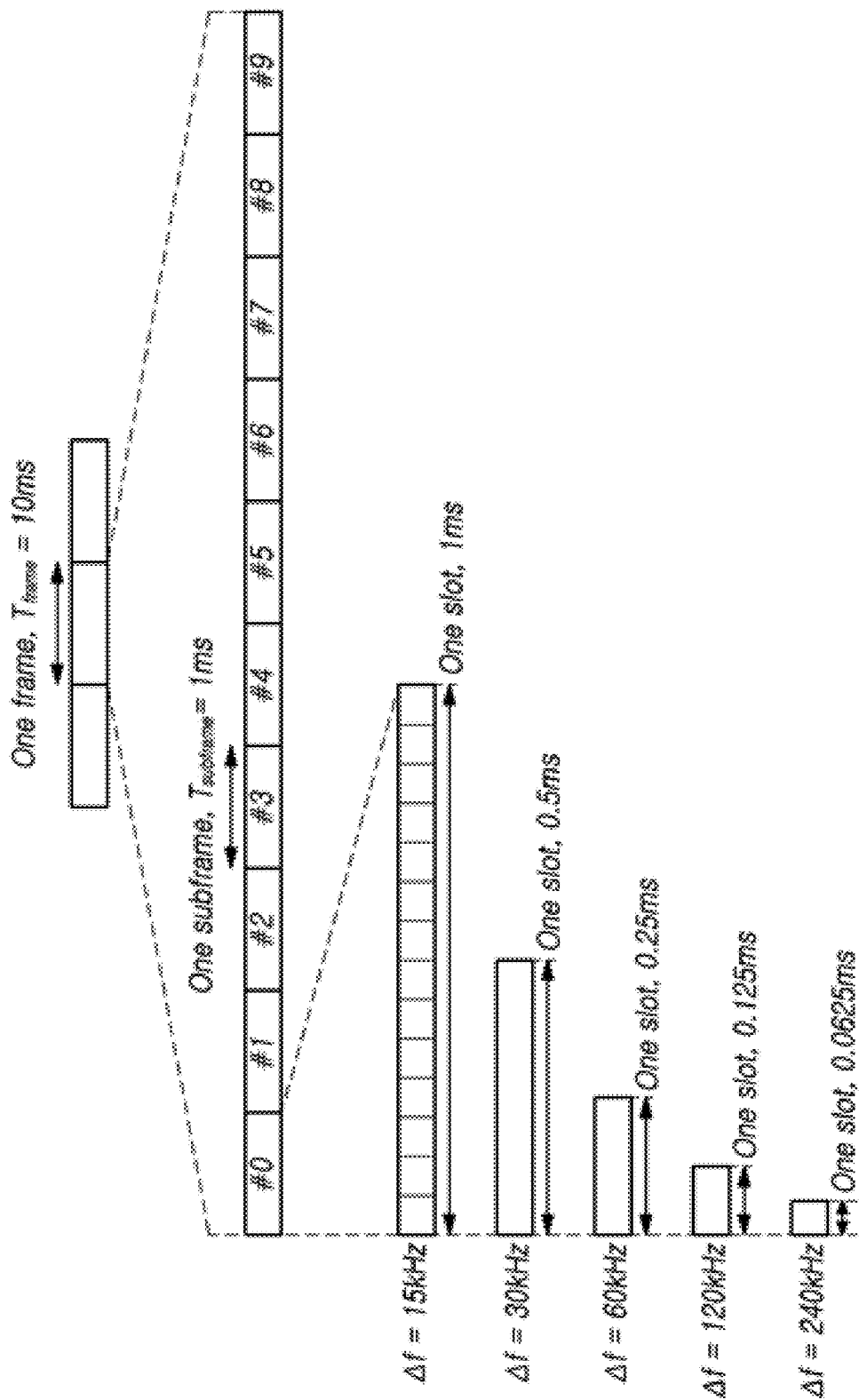
FIG. 2 is a view illustrating a frame structure in an NR system to which the present embodiments may apply.

As shown in Table 1 above, the NR numerologies may be divided into five types depending on the subcarrier spacing. This differs from the subcarrier spacing fixed to 15 kHz in LTE which is one 4G communication technology. Specifically, in NR, the subcarrier spacings used for data transmission are 15, 30, 60, and 120 khz, and the subcarrier spacings used for synchronization signal transmission are 15, 30, 12, and 240 khz. Further, the extended CP is applied only to the 60 khz subcarrier spacing. Meanwhile, as the frame structure in NR, a frame having a length of 10 ms, which is constituted of 10 subframes having the same length of 1 ms, is defined. One frame may be divided into half frames of 5 ms, and each half frame may include 5 subframes. In the case of the 15 khz subcarrier spacing, one subframe is constituted of one slot, and each slot is constituted of 14 OFDM symbols. FIG. 2 is a view illustrating a frame structure in an NR system to which the present embodiments may apply.

Referring to FIG. 2, a slot is fixedly composed of 14 OFDM symbols in the case of the normal CP, but the length of the slot in the time domain may vary depending on the subcarrier spacing. For example, in the case of a numerology having a 15 khz subcarrier spacing, a slot has the same length as the subframe, as the length of 1 ms. In contrast, in the case of a numerology having a 30 khz subcarrier spacing, a slot is constituted of 14 OFDM symbols, but two slots may be included in one subframe, as the length of 0.5 ms. In other words, the subframe and the frame are defined as having a fixed length, and the slot is defined with the number of symbols, and the temporal length may vary depending on the subcarrier spacing.

Meanwhile, NR defined a slot as the basic unit for scheduling and, to reduce transmission latency in the radio section, adopted minislot (or subslot or non-slot based schedule). If a wide subcarrier spacing is used, the length of one slot is inverse-proportionally shortened, so that it is possible to reduce transmission latency in the radio section. The minislot is for efficient support of the URLLC scenario and enables scheduling in the units of 2, 4, or 7 symbols.

Further, NR defined uplink and downlink resource allocation as the symbol level in one slot, unlike LTE. To reduce HARQ latency, a slot structure has been defined which enables HARQ ACK/NACK to be transmitted directly in the transmission slot, and such slot structure is referred to as a self-contained structure in the description.

NR has been designed to be able to support a total of 256 slots and, among them, 62 slot formats are used in 3GPP Rel-15. Further, a common frame structure constituting the FDD or TDD frame is supported through a combination of various slots. For example, a slot structure in which the symbols of the slot all are configured as downlink, a slot structure in which all the symbols are configured as uplink, and a slot structure in which downlink symbols and uplink symbols are combined are supported. Further, NR supports data transmission that is distributed and scheduled in one or more slots. Therefore, the base station may inform the UE whether the slot is a downlink slot, uplink slot, or flexible slot using the slot format indicator (SFI). The base station may indicate the slot format by indicating the index of the table configured through UE-specific RRC signaling, by the SFI and may indicate it dynamically through downlink control information (DCI) or statically or semi-statically through RRC.

<NR Physical Resource>

In connection with the physical resource in NR, antenna port, resource grid, resource element, resource block, and bandwidth part are taken into consideration.

An antenna port is defined so that the channel carried by a symbol on an antenna port may be inferred from the channel carried by another symbol on the same antenna port. Where the large-scale property of the channel carrying a symbol on one antenna port may be inferred from the channel carrying a symbol on a different antenna port, the two antenna ports may be said to have a QC/QCL (quasi co-located or quasi co-location) relationship. Here, the large-scale properties include one or more of delay spread, Doppler spread, frequency shift, average received power, and received timing.

Figure 3:
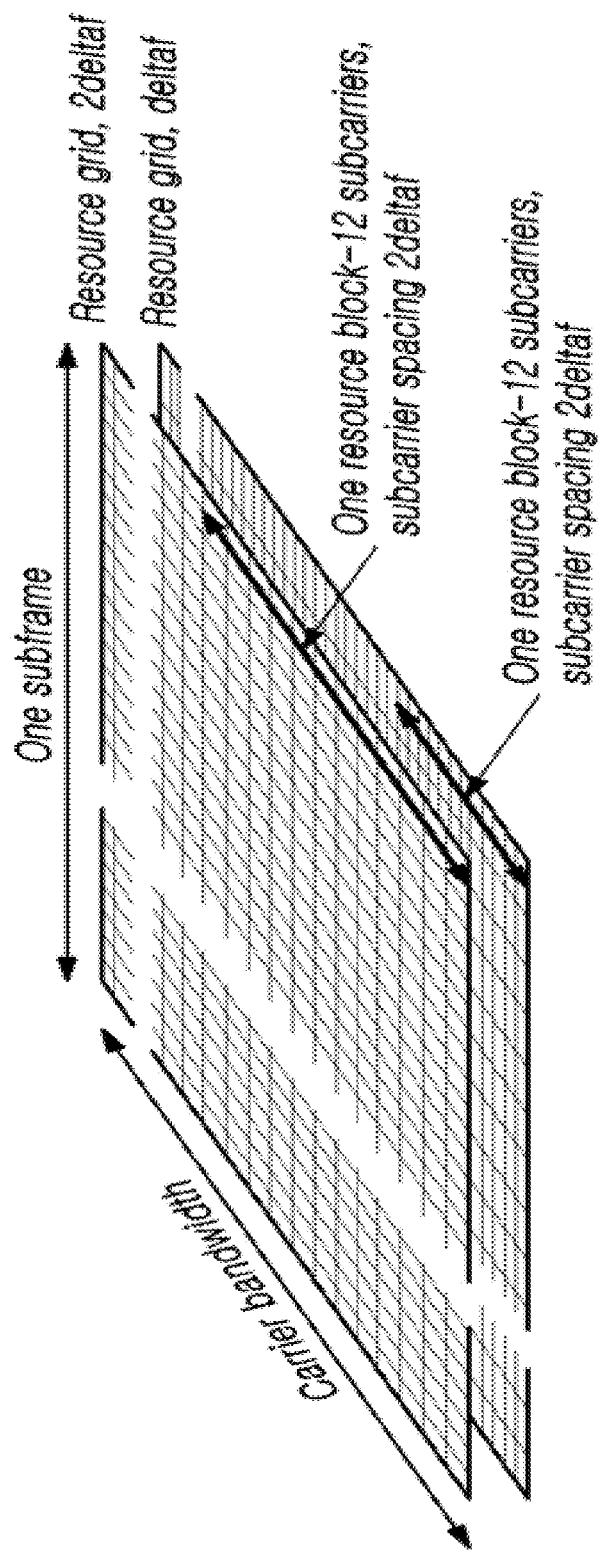
FIG. 3 is a view illustrating a resource grid supported by radio access technology to which
the present embodiments may apply.

FIG. 3 is a view illustrating a resource grid supported by radio access technology to which the present embodiments may apply.

Referring to FIG. 3, since NR supports a plurality of numerologies in the same carrier, a resource grid may exist depending on each numerology. Further, the resource grid may exist depending on the antenna port, subcarrier spacing, or transmission direction.

The resource block is constituted of 12 subcarriers and is defined only in the frequency domain. Further, the resource element is constituted of one OFDM symbol and one subcarrier. Therefore, as shown in FIG. 3, the size of one resource block may vary depending on the subcarrier spacing. Further, in NR, "point A", which serves as a common reference point for the resource block grid, and common resource block and virtual resource block are defined.

Figure 4:
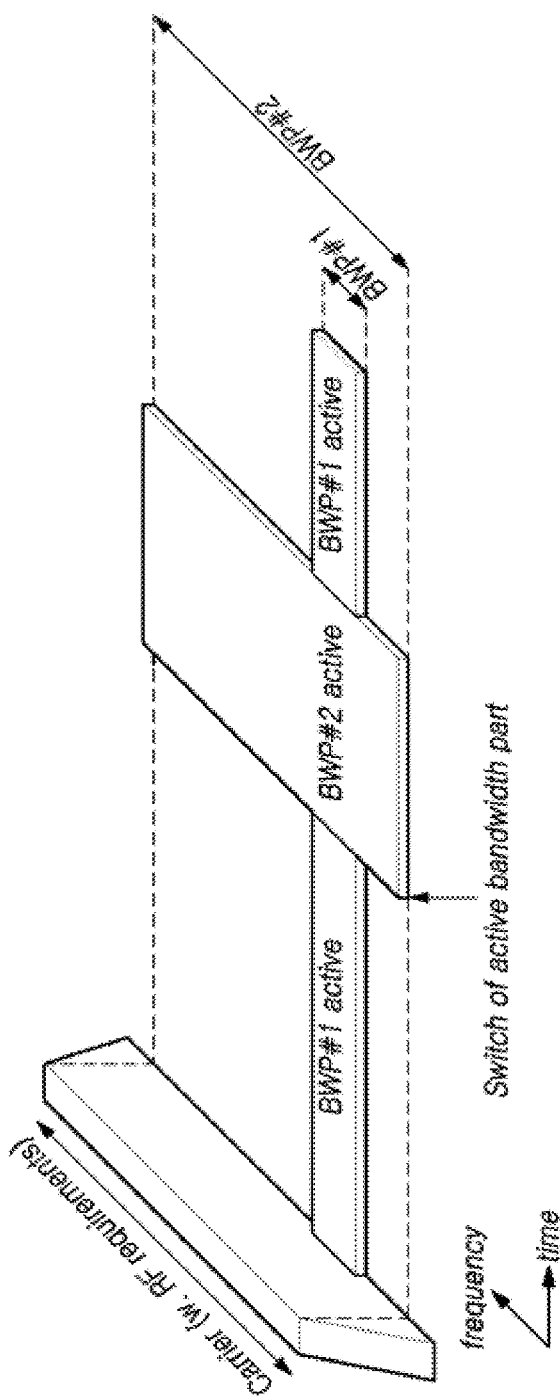
FIG. 4 is a view illustrating a bandwidth part supported by radio access technology to which the present embodiments may apply.

FIG. 4 is a view illustrating a bandwidth part supported by radio access technology to which the present embodiments may apply.

In NR, unlike LTE where the carrier bandwidth is fixed to 20 Mhz, the maximum carrier bandwidth from 50 Mhz to 400 Mhz is set for each subcarrier spacing. Therefore, it is not assumed that all UEs use all of these carrier bandwidths. Accordingly, in NR, as shown in FIG. 4, a bandwidth part (BWP) may be designated within the carrier bandwidth and used by the UE. Further, the bandwidth part is associated with one numerology and is composed of a subset of contiguous common resource blocks and may be activated dynamically over time. Up to four bandwidth parts may be configured in the UE for each of uplink and downlink. Data is transmitted/received using the bandwidth part activated at a given time.

In the case of paired spectra, the uplink and downlink bandwidth parts are set independently, and in the case of unpaired spectra, the bandwidth parts of uplink and downlink are set to make a pair to share the center frequency so as to prevent unnecessary frequency re-tuning between downlink and uplink operations.

<NR Initial Access>

In NR, the UE performs a cell search and random access procedure to access the base station and perform communication.

Cell search is a procedure in which the UE is synchronized with the cell of the base station using the synchronization signal block (SSB) transmitted from the base station, obtains the physical layer cell ID, and obtains system information.

Figure 5:
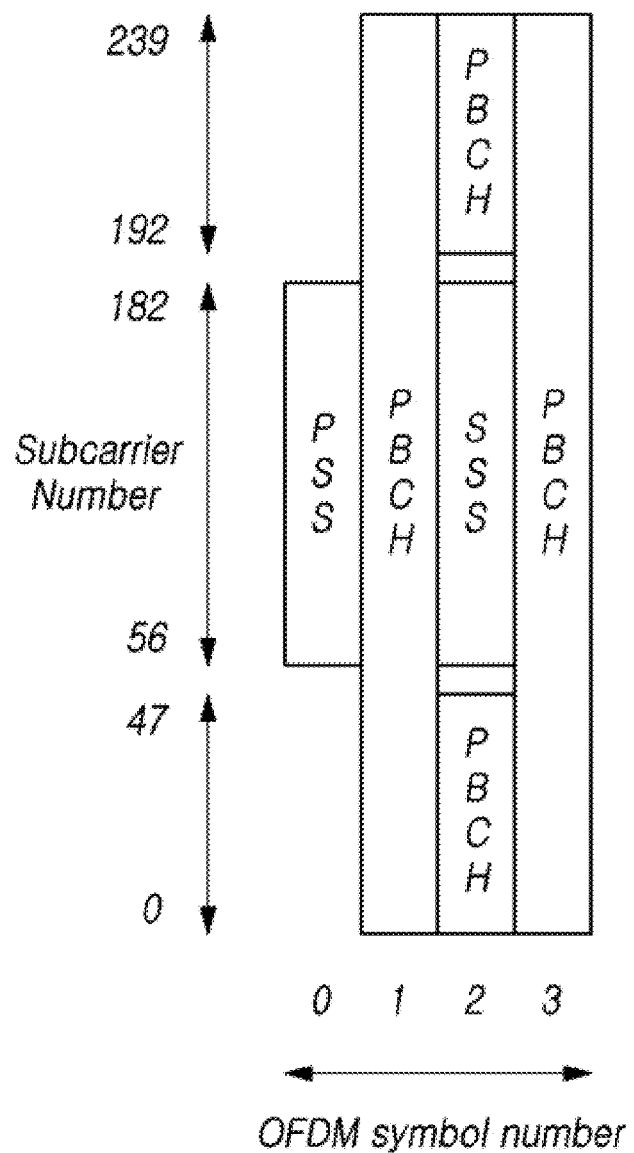
FIG. 5 is a view exemplarily illustrating a synchronization signal block in radio access technology to which the present embodiments may apply.

FIG. 5 is a view exemplarily illustrating a synchronization signal block in radio access technology to which the present embodiments may apply.

Referring to FIG. 5, the SSB is constituted of a primary synchronization signal (PSS) and a secondary synchronization signal (SSS) occupying 1 symbol and 127 subcarriers, respectively, and a PBCH spanning 3 OFDM symbols and 240 subcarriers.

The UE monitors the SSB in time and frequency domains and receives the SSB.

The SSB may be transmitted up to 64 times in 5 ms. Multiple SSBs are transmitted on different transmission beams within 5 ms time, and the UE performs detection assuming that SSBs are transmitted every 20 ms period based on one specific beam used for transmission. The number of beams available for SSB transmission within 5 ms may increase as the frequency band increases. For example, up to 4 SSB beams may be transmitted below 3 GHZ, SSBs may be transmitted using up to 8 different beams in a frequency band of 3 to 6 GHZ, and up to 64 different beams in a frequency band of 6 GHz or higher.

Two SSBs are included in one slot, and the start symbol and number of repetitions within the slot are determined according to the subcarrier spacing as follows.

Meanwhile, the SSB is not transmitted at the center frequency of the carrier bandwidth unlike the SS of conventional LTE. In other words, the SSB may be transmitted even in a place other than the center of the system band and, in the case of supporting wideband operation, a plurality of SSBs may be transmitted in the frequency domain. Accordingly, the UE monitors the SSB by a synchronization raster, which is a candidate frequency location for monitoring the SSB. The carrier raster and synchronization raster, which are the center frequency location information about the channel for initial access, are newly defined in NR, and the synchronization raster has a wider frequency interval than the carrier raster, enabling the UE to do a fast SSB search.

The UE may obtain the MIB through the PBCH of the SSB. The master information block (MIB) includes minimum information for the UE to receive remaining system information (remaining minimum system information (RMSI) broadcast by the network. Further, the PBCH may include information about the position of the first DM-RS symbol in the time domain, information for monitoring SIB1 by the UE (e.g., SIB1 numerology information, information related to SIB1 CORESET, search space information, PDCCH-related parameter information, etc.), offset information between the common resource block and the SSB (the absolute location of the SSB within the carrier is transmitted through SIB1), and the like. Here, the SIB1 numerology information is equally applied to some messages used in the random access procedure for the UE to access the base station after completing the cell search procedure. For example, the numerology information about SIB1 may be applied to at least one of messages 1 to 4 for the random access procedure.

The above-described RMSI may mean system information block 1 (SIB1). SIB1 is broadcast periodically (e.g., 160 ms) in the cell. SIB1 includes information necessary for the UE to perform an initial random access procedure, and is periodically transmitted through the PDSCH. To receive SIB1, the UE needs to receive numerology information used for SIB1 transmission and control resource set (CORESET) information used for SIB1 scheduling through the PBCH. The UE identifies scheduling information for SIB1 using SI-RNTI in CORESET and obtains SIB1 on PDSCH according to scheduling information. The remaining SIBs except for SIB1 may be transmitted periodically and may be transmitted at the request of the UE.

Figure 6:
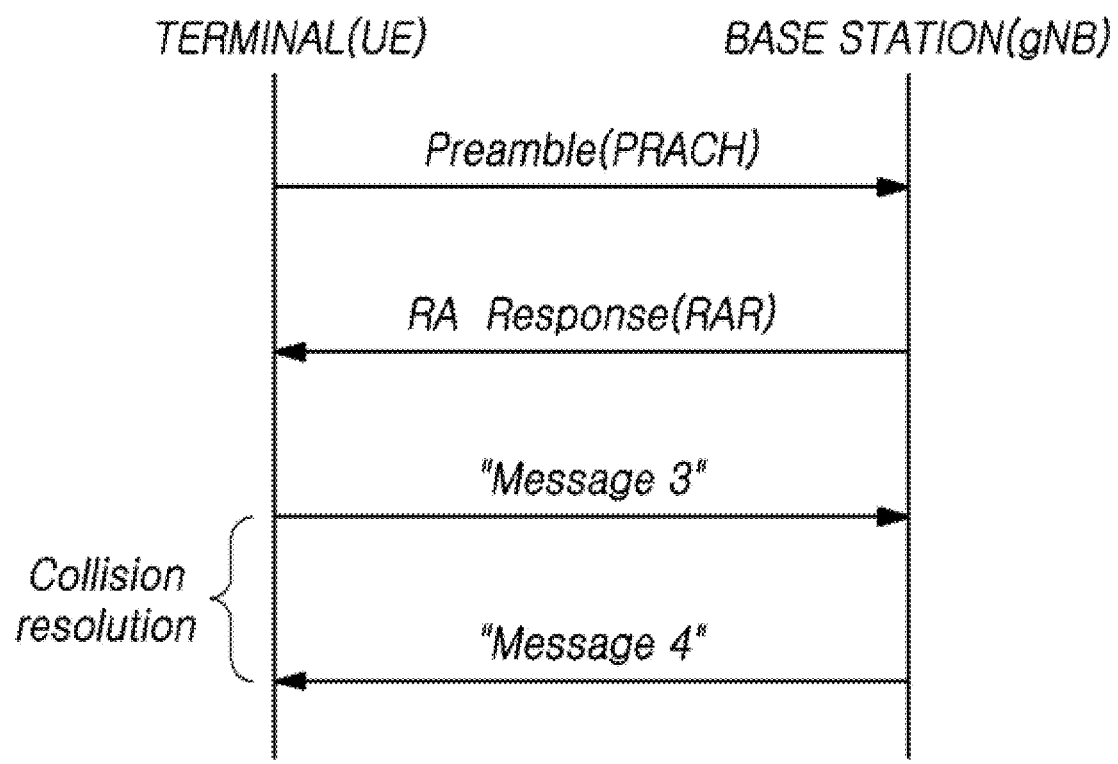
FIG. 6 is a view illustrating a random access procedure in radio access technology to which the present embodiments may apply.

FIG. 6 is a view illustrating a random access procedure in radio access technology to which the present embodiments may apply.

Referring to FIG. 6, if the cell search is completed, the UE transmits a random access preamble for random access to the base station. The random access preamble is transmitted through PRACH. Specifically, the random access preamble is transmitted to the base station through the PRACH composed of contiguous radio resources in a periodically repeated specific slot. In general, when the UE initially accesses the cell, a contention-based random access procedure is performed, and when random access is performed for beam failure recovery (BFR), a non-contention-based random access procedure is performed.

The UE receives a random access response to the transmitted random access preamble. The random access response may include a random access preamble identifier (ID), uplink radio resource (UL grant), temporary cell-radio network temporary identifier (C-RNTI), and time alignment command (TAC). Since one random access response may include random access response information for one or more UEs, the random access preamble identifier may be included to indicate to which UE the included UL grant, temporary C-RNTI, and TAC are valid. The random access preamble identifier may be an identifier for the random access preamble received by the base station. The TAC may be included as information for the UE to adjust uplink synchronization. The random access response may be indicated by the random access identifier on the PDCCH, that is, the random access-radio network temporary identifier (RA-RNTI).

Upon receiving a valid random access response, the UE processes information included in the random access response and performs scheduled transmissions to the base station. For example, the UE applies the TAC and stores the temporary C-RNTI. Further, the UE transmits data stored in the buffer of the UE or newly generated data to the base station using the UL grant. In this case, information that may identify the UE should be included.

Finally, the UE receives a downlink message for contention resolution.

<NR CORESET>

In NR, the downlink control channel is transmitted in a control resource set (CORESET) having a length of 1 to 3 symbols and transmits uplink/downlink scheduling information, slot format index (SFI), transmit power control (TPC) information, etc.

As such, NR introduced the concept of CORESET to secure the flexibility of the system. The control resource set (CORESET) means a time-frequency resource for a downlink control signal. The UE may use one or more search spaces in CORESET time-frequency resources to decode control channel candidates. A quasi co-location (QCL) assumption for each CORESET has been set, which is used for the purpose of indicating the characteristics of the analog beam direction in addition to the latency spread, Doppler spread, Doppler shift, and average latency, which are characteristics assumed by the conventional QCL.

Figure 7:
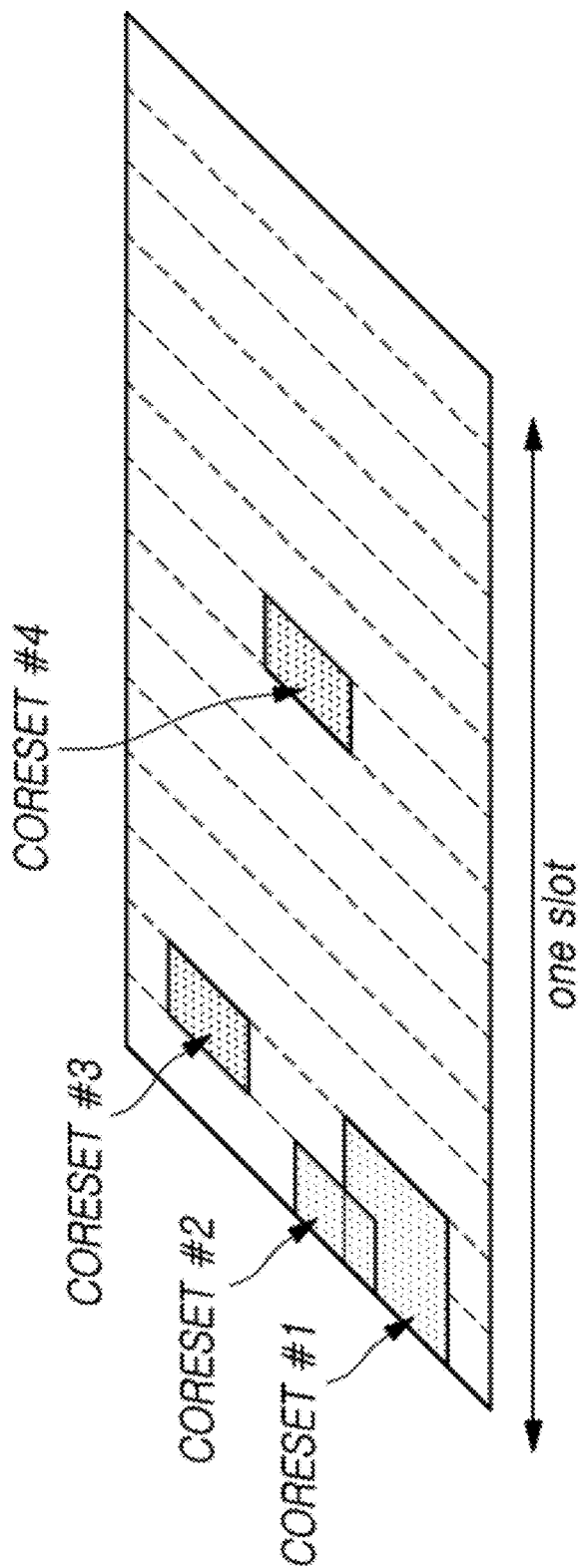
FIG. 7 is a view illustrating a CORESET.

FIG. 7 is a view illustrating a CORESET.

Referring to FIG. 7, the CORESET may exist in various forms within a carrier bandwidth within one slot. In the time domain, the CORESET may be constituted of up to 3 OFDM symbols. Further, the CORESET is defined as a multiple of 6 resource blocks up to the carrier bandwidth in the frequency domain.

The first CORESET is indicated through the MIB as part of the initial bandwidth part configuration to allow additional configuration and system information to be received from the network. After connection setup with the base station, the UE may receive and configure one or more CORESET information through RRC signaling.

As used herein, the frequency, frame, subframe, resource, resource block, region, band, subband, control channel, data channel, synchronization signal, various reference signals, various signals, and various messages related to new radio (NR) may be interpreted in various meanings as currently used or to be used in the future.

<Sidelink>

In the conventional LTE system, for direct communication between UEs and providing a V2X (particularly V2V) service, a radio channel and radio protocol have been designed for inter-UE direct communication (i.e., sidelink).

In relation to the sidelink, S-PSS/S-SSS, which is a synchronization signal for synchronization between a wireless sidelink transmitting end and a receiving end, and physical sidelink broadcasting channel (PSBCH) for transmitting and receiving a sidelink master information block (MIB) related thereto have been defined, and physical sidelink discovery channel (PSDCH), physical sidelink control channel (PSCCH) for sidelink control information (SCI) transmission/reception, and physical sidelink shared channel (PSSCH) have been designed.

Further, to allocate a radio resource for sidelink, technology has been developed separately into mode 1 in which the base station allocates a radio resource and mode 2 in which the UE selects and allocates one from a radio resource pool. Further, the LTE system required an additional technical evolution to meet the V2X scenario.

In this environment, 3GPP derived 27 service scenarios related to vehicle recognition in Rel-14 and determined the main performance requirements according to road conditions. Further, in the recent Rel-15, 25 more advanced service scenarios, such as platooning, advanced driving, and long-distance vehicle sensors, were derived, and six performance requirements were determined.

To meet these performance requirements, technology development has been conducted to enhance the performance of sidelink technology developed based on conventional D2D communication to meet the requirements of V2X. In particular, to apply to cellular-V2X (C-V2X), a technology that enhances the physical layer design of sidelink to be suitable for a high-speed environment, resource allocation technology, and synchronization technology may be selected as major research technologies.

The sidelink described below may be understood as encompassing links used for D2D communication developed after 3GPP Rel-12, V2X communication after Rel-14, and NR V2X after Rel-15. Further, each channel term, synchronization term, and resource term are described with the same terms regardless of D2D communication requirements and V2X Rel-14 and 15 requirements. However, for convenience of understanding, the differences of sidelinks meeting V2X scenario requirements from the sidelinks for D2D communication in Rel-12/13 are mainly described as necessary. Accordingly, the sidelink-related terms described below are divided merely for D2D communication/V2X communication/C-V2X communication for convenience of understanding and comparison, and are not limited to a specific scenario.

<Resource Allocation>

Figure 8:
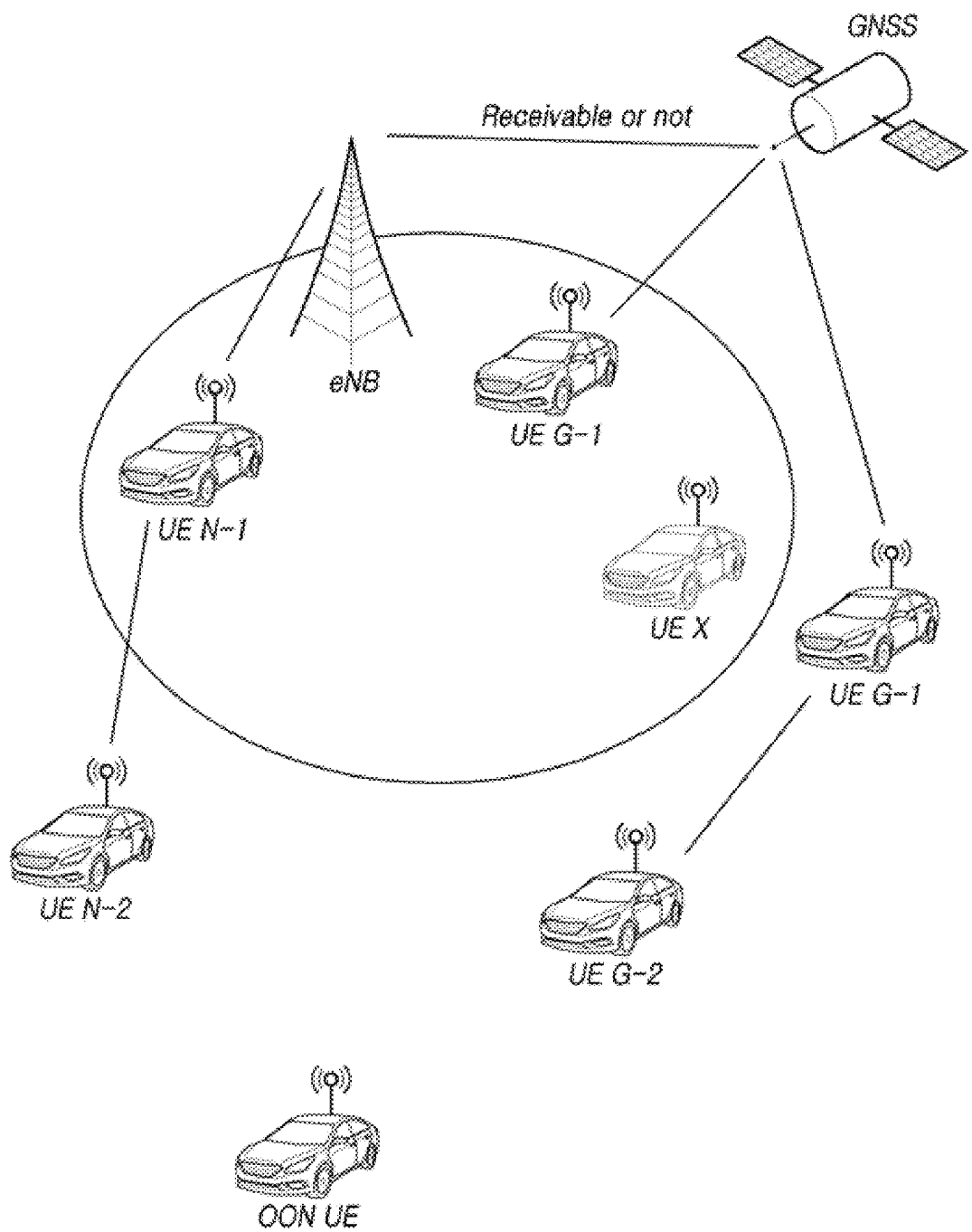
FIG. 8 is a view illustrating various scenarios for V2X communication.

FIG. 8 is a view illustrating various scenarios for V2X communication.

Referring to FIG. 8, a V2X UE (marked as a vehicle, but may be set in various ways, such as UE) may be positioned within or outside the coverage of the base station (eNB or gNB or ng-eNB). For example, communication may be performed between UEs (UE N-1, UE G-1, and UE X) within the coverage of the base station, or communication may be performed between a UE within the coverage of the base station and a UE outside (e.g., UE N-1, UE N-2). Or, communication may be performed between UEs (e.g., UE G-1 and UE G-2) outside the coverage of the base station.

In these various scenarios, allocation of radio resources for communication is required in order for the corresponding UE to perform communication using the sidelink, and the allocation of radio resources largely includes base station handling allocation and UE self selection and allocation.

Specifically, the scheme in which the UE allocates resources in the sidelink includes a scheme in which the base station involves in selection and management of resources (mode 10 and a scheme in which the UE itself selects resources (mode 2). In mode 1, the base station schedules a scheduling assignment (SA) pool resource region and a DATA pool resource region allocated thereto to the transmission UE.

Meanwhile, the resource pool may be subdivided into several types. First, the resource pool may be divided according to the contents of the sidelink signal transmitted in each resource pool. For example, the contents of the sidelink signal may be divided, and for each, a separate resource pool may be configured. As the contents of the sidelink signal, there may be a scheduling assignment (SA), a sidelink data channel, and a discovery channel.

The SA may be a signal including information such as the position of the resource used by the transmission UE in transmission of the following sidelink data channel and modulation and coding scheme (MCS) or MIMO transmission scheme necessary for modulation of other data channels, and timing advance (TA). This signal may be multiplexed with the sidelink data on the same resource unit and transmitted and, in this case, the SA resource pool may mean a pool of resources in which the sA is multiplexed with the sidelink data and transmitted.

Meanwhile, the FDM scheme applied to V2X communication may reduce the latency time when a data resource is allocated after SA resource allocation. For example, a non-adjacent scheme of separating the control channel resource and the data channel resource in one subframe in the time domain and an adjacent scheme in which the control channel and the data channel are contiguously allocated in one subframe are considered.

Meanwhile, when the SA is multiplexed and transmitted with the sidelink data on the same resource unit, only sidelink data channel except for the SA information may be transmitted in the resource pool for the sidelink data channel. In other words, the resource elements which have been used to transmit SA information on the individual resource unit in the SA resource pool may still be used to transmit sidelink data in the sidelink data channel resource pool. The discovery channel may be a resource pool for messages to allow the transmission UE to transmit its ID or such information to be discovered by the adjacent UE. Even when the contents of the sidelink signal are the same, different resource pools may be used depending on the transmission/reception attributes of the sidelink signal.

As an example, despite the sidelink data channel or discovery message, they may be divided into different resource pools depending on sidelink signal transmission timing determination schemes (e.g., whether it is transmitted at the time of reception of a sync reference signal or it is transmitted, with a predetermined TA applied), resource allocation schemes (e.g., whether the base station designates the transmission resources of individual signals for UE or individual transmission UEs select individual signal transmission resources on their own), signal formats (e.g., the number of symbols each sidelink signal occupies in one subframe or the number of subframes used for transmission of one sidelink signal), signal strengths from the base station, or the transmit power strengths of sidelink UE.

<Synchronization Signal>

As described above, a sidelink communication UE is highly likely to be positioned outside the base station coverage. Even in this case, communication using the side link should be performed. To this end, the issue of obtaining synchronization by the UE positioned outside the base station coverage is important.

A method for synchronization in time and frequency in sidelink communication, particularly communication between vehicles, between a vehicle and another UE, and between a vehicle and the infrastructure network is described based on the foregoing description.

D2D communication used a sidelink synchronization signal (SLSS), which is a synchronization signal transmitted from the base station for time synchronization between UEs. In C-V2X, a satellite system (global navigation satellite system (GNSS) may be additionally considered to enhance synchronization performance. However, priority may be given to synchronization establishment or the base station may indicate priority information. For example, the UE first selects the synchronization signal directly transmitted by the base station in determining transmission synchronization of the UE and, if the UE is positioned at the edge of the coverage of the base station, synchronization is preferentially made preferentially with the SLSS transmitted by the UE inside the coverage of the base station.

Meanwhile, the wireless UE installed in the vehicle or the UE mounted in the vehicle is relatively less susceptible to the battery consumption issue and may use satellite signals, such as GPS, for navigation purposes, and may thus use satellite signals in establishing synchronization in time and frequency between UEs. Here, the satellite signals may be GNSS signals, such as global navigation satellite system (GLONAS), GALILEO, and BEIDOU in addition to the exemplified global positioning system (GPS).

Meanwhile, sidelink synchronization signals may include a sidelink primary synchronization signal (S-PSS) and a sidelink secondary synchronization signal (S-SSS). The S-PSS may have a Zadoff-chu sequence of a predetermined length or a similar/modified/repeated structure of the PSS. Further, unlike the DL PSS, other Zadoff Chu root indexes (e.g., 26 and 37) may be used. The S-SSS may have a similar/modified/repeated structure of the SSS or the M-sequence. If the UEs are synchronized from the base station, the SRN becomes the base station, and the sidelink synchronization signal (S-SS) becomes the PSS/SSS.

Unlike DL PSS/SSS, S-PSS/S-SSS follows the UL subcarrier mapping scheme. The physical sidelink broadcast channel (PSBCH) may be a channel where basic system information that the UE needs to know first before transmitting and receiving sidelink signals (e.g., information related to S-SS, duplex mode (DM), TDD UL/DL configuration, resource pool related information, type of application related to S-SS, subframe offset, broadcast information, etc.) is transmitted. The PSBCH may be transmitted on the same subframe as the S-SS or on a subsequent subframe. The DMRS may be used for demodulation of PSBCH. The S-SS and PSBCH may be referred to as sidelink synchronization signal block (S-SSB).

The SRN may be a node transmitting S-SS and PSBCH. The S-SS may have a specific sequence form. The PSBCH may have a form of a sequence indicating specific information or a codeword that has undergone predetermined channel coding. Here, the SRN may be a base station or a specific sidelink UE. In the case of partial network coverage or out of network coverage, the UE may become the SRN.

Further, the S-SS may be relayed for sidelink communication with out-of-coverage UEs as needed and be relayed through multiple hops. In the following description, relaying a synchronization signal is a concept that includes not only directly relaying a synchronization signal of a base station but also transmitting a sidelink synchronization signal in a separate format according to the synchronization signal reception time. As the sidelink synchronization signal is so relayed, the in-coverage UE and the out-of-coverage UE may directly communicate.

<NR Sidelink>

As described above, unlike V2X based on the LTE system, there is a demand for NR-based V2X technology to meet complex requirements, such as of autonomous driving. NR V2X intends to flexibly provide V2X services in more diverse environments by applying the frame structure, numerology, and channel transmission and reception procedures of NR. To this end, development of technologies, such as a resource sharing technology between a base station and a UE, a sidelink carrier aggregation (CA) technology, a partial sensing technology for a pedestrian UE, and sTTI is required.

NR V2X is determined to support unicast and group cast as well as broadcast used in LTE V2X. In this case, for groupcast and unicast, the target group ID is determined to be used, but whether to use the source ID is determined to be discussed later.

Further, as HARQ for QoS is supported, control information is determined to include the HARQ process ID as well. In LTE HARQ, the PUCCH for HARQ is transmitted four subframes after downlink transmission. However, in NR HARQ, the PUCCH resource and feedback timing may be indicated by the PUCCH resource indicator or PDSCH-to-HARQ feedback timing indicator in, e.g., DCI format 1_0 or 1_1.

In LTE V2X, separate HARQ ACK/NACK information was not transmitted to reduce system overhead, and for data transmission stability, the transmission UE was determined to be able to retransmit data once according to its selection. However, NR V2X is able to transmit HARQ ACK/NACK information in light of data transmission stability and, in this case, bundle and transmit information, reducing overhead.

In other words, the transmission UE UE1 may transmit three data to the reception UE UE2 and, if the reception UE generates HARQ ACK/NACK information in response, the information may be bundled and transmitted through the PSCCH.

Meanwhile, in FR1 for the frequency domain below 3 GHz, it was determined to later discuss 15 kHz, 30 kHz, 60 kHz, and 120 kHz as subcarrier spacing (SCS) candidates. Further, for FR2 for the frequency domain above 3 GHz, it was determined to discuss 30 kHz, 60 kHz, 120 kHz, and 240 kHz as subcarrier spacing (SCS) candidates. NR V2X may support minislots (e.g., 2/4/7 symbols) smaller than 14 symbols as the minimum scheduling unit.

As RS candidates, DM-RS, PT-RS, CSI-RS, SRS, and AGC training signals were determined to be discussed.

Sidelink UL SPS

In general, UL transmission using SPS may cause some latency when the gap between user data generation and configured SPS resources is large. Therefore, when SPS is used for latency-sensitive traffic, such as sidelink communication, the SPS scheduling interval should be small enough to support the latency requirements.

However, a smaller SPS scheduling interval may result in more overhead since the UE may not fully utilize the configured SPS resources. Therefore, the gap between user data generation and the configured SPS resources should be small, and the SPS scheduling interval should be suitable to meet the latency requirements. Currently, there is no mechanism to support this feature.

The UE may receive an SPS configuration for one or more specific logical channels. The UE may receive SPS configuration for a specific logical channel through system information, an RRC connection setup message, an RRC connection reconfiguration message or an RRC connection release message.

When data is available for a specific logical channel(s), the UE may request the base station to activate SPS and then perform UL transmission using the configured SPS resources according to the SPS activation command received from the base station. The UE may transmit an SPS activation request to the base station through a physical uplink control channel (PUCCH), MAC control element (CE) or RRC message. In other words, the UE may transmit an SPS activation request to the base station using control resources used for requesting SPS activation. The control resource may be a PUCCH resource, a random access resource, or a new UL control channel resource. Further, the UE may transmit an SPS activation request to the base station during, e.g., RRC connection (re-)establishment, during handover, after handover, or in RRC_CONNECTED.

Since the UE actively requests SPS activation from the base station when there is UL data to be transmitted, the gap between the generation of UL data and configured SPS resources may be reduced.

For example, the UE receives SPS configuration information including three SPS configurations from the base station. If there is UL data to be transmitted in the upper layer, the UE transmits an SPS request message to the base station through a MAC CE, for example. The base station sends an Ack message for one of the three SPS configurations. The UE transmits UL data through a specific resource, e.g., in a 1 sec period, according to the corresponding SPS configuration.

Meanwhile, if there is UL data to be transmitted in the upper layer at a specific time, the UE transmits again an SPS request message to the base station through a MAC CE, for example. The base station sends an Ack message for another one of the three SPS configurations. The UE transmits UL data through a specific resource, e.g., in a 100 sec period, according to the corresponding SPS configuration.

Meanwhile, S-SS id_net is a set of S-SS IDs used by UEs that have selected the synchronization signal of the base station as a synchronization reference among physical layer SLSS IDs {0, 1, . . . , 335} and may be {0, 1, . . . , 167}. Further, S-SS id_oon is a set of S-SS IDs used when the base stations/out-of-coverage UEs transmit synchronization signals by themselves, and may be {168, 169, . . . , 335}.

As described above, unlike conventional signal transmission and reception between a base station and a UE, sidelink communication between UEs performs resource allocation, time synchronization setting, and reference signal transmission independently or in conjunction with the base station.

In particular, in the case of next-generation radio access technology (including terms, such as NR and 5G), a number of protocols between the base station and the UE have been added/modified. Therefore, unlike the conventional LTE technology-based V2X communication protocol, NR technology-based sidelink communication also requires development of various protocols.

In the disclosure, there are proposed operations, such as PSCCH, PSSCH, or DMRS configuration, resource allocation, and synchronization signal reception when the transmission UE and the reception UE perform sidelink communication. Each embodiment below is described focusing on sidelink communication, but may also be applied to C-V2X and D2D communication as described above.

As the subcarrier spacing (SCS) of the OFDM communication system is varied in NR, the frame structure of the sidelink to be used for information transmission and reception in sidelink communication needs to be changed as well.

In the present embodiments, the sidelink signal may use the CP-OFDM-type waveform of the CP-OFDM type and the DFT-s-OFDM type. Further, the sidelink may use the following subcarrier spacing (hereinafter, 'SCS'). For example, in frequency range (FR) 1 which uses a frequency band less than 6 GHz, SCSs of 15 kHz, 30 kHz, and 60 kHz are used and, in this case, the 60 kHz spacing, which exhibits the best performance, may be set to be used. In FR2 which uses a frequency band of 6 GHz or more, spacings of 60 kHz and 120 kHz are used, and the 60 kHz band may primarily be used.

Further, the sidelink uses a cyclic prefix (CP) to prevent modulation that may arise during the course of wireless communication transmission/reception, and its length may be set to be equal to the length of the normal CP of the NR Uu interface. If necessary, an extended CP may be applied.

As described above, sidelink communication may be performed based on NR radio access technology. Further, given a scenario for sidelink communication, there is a likelihood that multiple UEs gather in a predetermined range and perform communication, as when platooning.

In this case, the radio resources for sidelink communication may frequently collide with each other. In particular, a procedure for settling resource conflict may be required in Mode 2 in which the UE selects a sidelink communication resource from a predetermined resource pool based on a sensing operation, unlike in Mode 1 in which the base station allocates and schedules a sidelink communication resource.

Under these circumstances, embodiments of a wireless resource coordination technique are described below.

Figure 9:
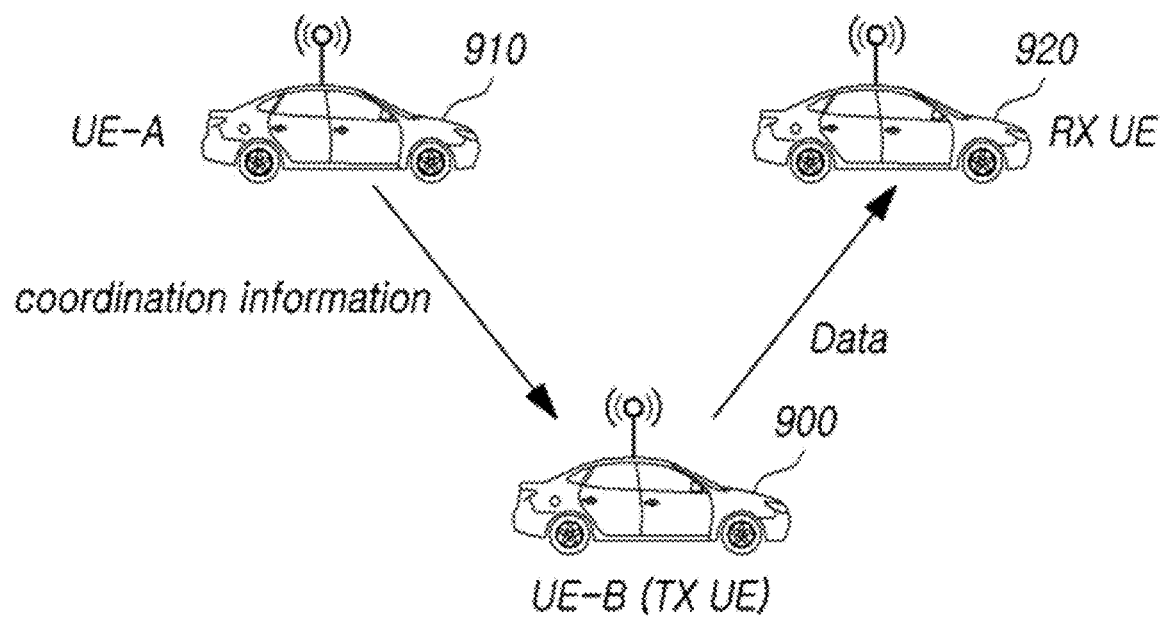
FIG. 9 is a view illustrating a communication operation using coordination information according to an embodiment.

FIG. 9 is a view illustrating a communication operation using coordination information according to an embodiment.

Referring to FIG. 9, sidelink communication may be performed between UE-B (TX UE) 900 and RX UE 920. In this case, UE-B 900 transmits data to RX-UE (920) using resources for performing sidelink communication.

However, in the case of a sidelink resource allocation mode in which UE-B 900 selects resources for performing sidelink communication, resources used by other UEs may overlap. If resources overlap, sidelink communication may not be performed smoothly.

Accordingly, UE-A 910 may transmit coordination information to UE-B 900 to prevent resource conflict problems. For example, UE-B 900 may prevent conflicts by selecting radio resources to be used for sidelink communication based on the received coordination information (RSAI). In other words, UE-A 910 may be a coordinator UE that provides resource selection assistance information (RSAI) to UE-B 900 through inter-UE coordination. Meanwhile, UE-B 900 is a TX UE that receives coordination information from UE-A 910.

Specifically, the following embodiment may be applied for coordination between UEs in sidelink resource allocation mode 2 (a mode in which the UE selects sidelink resources on its own).

As an example, UE-A 910 may transmit, to UE-B 900, preferred resource information that may be used by UE-B 900 and/or non-preferred resource information that may not be used by UE-B 900 at the request of UE-B 900.

As another example, even when there is no request from UE-B 900, UE-A 910 may transmit, to UE-B 900, coordination information indicating whether there is a conflict and the conflict resource for the sidelink radio resource that UE-B 900 intends to use.

However, in the embodiment of transmitting and receiving coordination information as above, there are various execution issues, such as whether UE-B 900 may process the coordination information and what information should be included in the coordination information. Therefore, various embodiments are described below in greater detail, focusing on operations for smooth transmission/reception of coordination information. For convenience of description, the UE that receives the coordination information is referred to as a UE and the UE that transmits the coordination information is referred to as a second UE. However, the role of each UE may be described in detail as needed.

Figure 10:
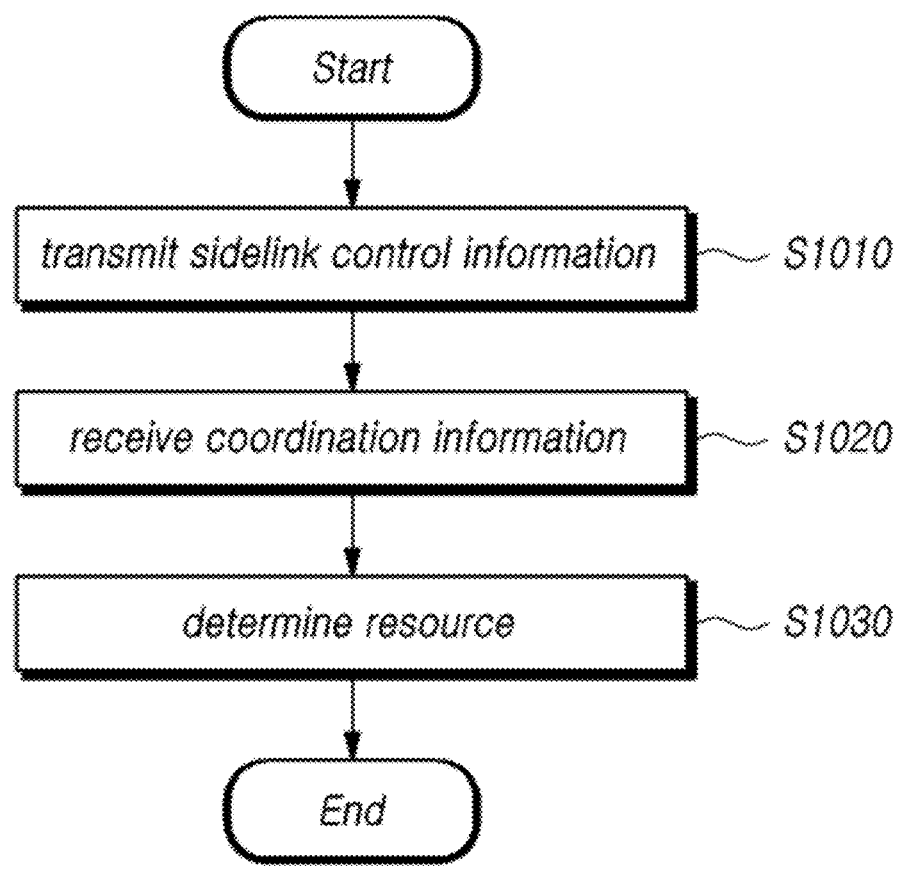
FIG. 10 is a view for describing operations of a UE according to an embodiment.

FIG. 10 is a view for describing operations of a UE according to an embodiment.

Referring to FIG. 10, the UE may perform a step of transmitting sidelink control information including request information for requesting coordination information and indication information indicating a resource type to be included in the coordination information to the second UE (S1010).

The UE may be configured to select a sidelink radio resource by receiving the coordination information through higher layer signaling. The higher layer signaling may be received from the base station and may be an RRC message. For example, whether to process coordination information of the UE may be indicated through disable or enable processing of a specific field in the RRC message.

The UE may request coordination information to select a resource for sidelink communication.

For example, the UE may include request information for requesting coordination information in the sidelink control information and transmit the same to the second UE. As another example, the UE may include the indication information for indicating the resource type to be included in the coordination information in the sidelink control information and transmit the same to the second UE. As another example, the UE may include both the request information and the indication information in the sidelink control information and transmit the same to the second UE.

For example, the sidelink control information including the request information and/or the indication information may be transmitted through a physical sidelink shared channel (PSSCH). The sidelink control information includes first sidelink control information included in the PSCCH and second sidelink control information included in the PSSCH. In this case, the above-described request information and/or indication information may be included in the second sidelink control information.

Specifically, the request information may indicate whether the UE requests coordination information.

For example, the request information may be indicated by a value of a first field composed of 1 bit included in the sidelink control information. The value of the first field may be used to identify whether the sidelink control information is for requesting coordination information or for providing coordination information. In other words, the first field is a field for identifying whether sidelink control information including request information is used to request coordination information or to include and provide coordination information. For example, if the value of the first field is set to '0', it may mean that the corresponding sidelink control information is for requesting coordination information, and another field and/or the value of the other field may be changed accordingly. If the value of the first field is set to '1', it may mean that the corresponding sidelink control information may include coordination information, and in this case, the coordination information may be additionally included. Of course, the values of the first field may be set to be opposite to each other.

As another example, the indication information may be indicated by a value of a second field composed of 1 bit distinguished from the first field included in the sidelink control information. For example, the second field may be included when the value of the first field is set to request coordination information. The second field may indicate which resource type the coordination information requested by the UE requests. For example, the second UE transmitting the coordination information may include the preferred resource information in the coordination information and transmit the same. Alternatively, the second UE may include the non-preferred resource information in the coordination information and transmit the same. Accordingly, in requesting the coordination information, the UE may designate which information (resource type) to request. In other words, the value of the second field may be used to indicate the resource type of any one of the preferred resource information and the non-preferred resource information determined by the second UE. If the value of the second field is set to '0', it may be interpreted that the UE requests to transmit the preferred resource information through the coordination information. Alternatively, if the value of the second field is set to '1', it may be interpreted that the UE requests to transmit the non-preferred resource information through the coordination information.

As described above, in requesting coordination information, the UE may also request a required resource type.

The UE may perform the step of receiving coordination information from the second UE (S1020).

For example, when the UE requests the coordination information, the UE may receive the coordination information from the second UE. The coordination information may be received through a PSSCH or a PSCCH. If the second UE receives the sidelink control information requesting the coordination information from the UE, the second UE may generate the preferred resource information or the non-preferred resource information in consideration of, e.g., the resource sensing result, the resource use information, etc. sensed by the second UE. Further, the second UE may generate any one of the preferred resource information and the non-preferred resource information based on the indication information received from the UE and transmit the same to the UE.

The UE may receive preferred resource information or non-preferred resource information from the second UE through coordination information based on transmission of the sidelink control information including the request information and the indication information.

The UE may perform the step of determining a resource for performing the sidelink communication based on at least one of the coordination information and the resource sensing information (S1030).

For example, the UE may select a resource for performing sidelink communication using at least one of coordination information and sensing result resource information sensed in the sensing window. The UE should select a sidelink radio resource to communicate with the target UE (RX UE 920 in FIG. 9). In particular, in mode 2, since the base station configures a sidelink radio resource pool in the UE and the UE selects the resource within the pool, the UE should directly select the resource to be used.

To select a sidelink radio resource, the UE selects a specific radio resource using a resource sensing result in a preset sensing window. As the resource sensing result, a channel measurement result such as RSRP for a specific frequency resource may be used.

Meanwhile, the UE according to the present embodiment may select the sidelink radio resource using both the sensing result resource information and the above-described coordination information.

As an example, the UE may select a resource commonly included in the sensing result resource information and the preferred resource information as the resource for performing the sidelink communication when the preferred resource information is included in the coordination information.

As another example, when the coordination information includes the preferred resource information, the UE may select a resource for performing sidelink communication from the preferred resource information without using the sensing result resource information.

As another example, the UE may select the resource for performing the sidelink communication except for a radio resource included in the non-preferred resource information from the sensing result resource information when the non-preferred resource information is included in the coordination information.

The above-described preferred resource information may include information about a radio resource preferred by the second UE to be used by the UE. The non-preferred resource information may include information about a radio resource that the second UE expects not to use by the UE.

As such, when coordination information is received, the UE may select sidelink radio resources based on the sensing result resource information and coordination information. Through this operation, the UE may reduce the probability of communication problems due to resource conflicts even in an environment where multiple UEs perform sidelink communication. Further, by requesting coordination information and indicating a specific resource type as needed, unnecessary increases in system overhead may be prevented.

The foregoing description focuses primarily on operations according to an explicit request among schemes in which coordination information is transmitted/received, but the disclosure is not limited thereto. More various embodiments that may be performed by the above-described UE are described below in detail.

For example, the UE may transmit an index of N bits through a specific sidelink control information format to transmit a type of inter-UE coordination information required for sensing a sidelink resource to the second UE.

For example, the index of N bits may be composed of 2 bits. The 2-bit index may indicate whether the UE requests coordination information and the requested resource type as shown in Table 2 below. Table 2 exemplarily discloses the content of requesting the coordination information scheme type at once using 2 bits.

TABLE 2

| Index | Scheme | Type | Container |
| --- | --- | --- | --- |
| 0 | — | no coordination information needed | $2^{nd}$ SCI format in PSSCH |
| 1 | 1 | Preferred and/or non-preferred resource set requested | $2^{nd}$ SCI format in PSSCH |
| 2 | 2 | Presence of expected/potential resource conflict | PSFCH-like |
| 3 | 2 | Presence of expected/potential resource conflict and detected resource conflict | PSFCH-like |

As another example, the UE may indicate whether coordination information is requested using one bit of the two bits. Further, the UE may indicate the type of the resource requested using the other one bit. For example, the UE may indicate whether coordination information is requested using one bit and indicate the resource type through the remaining one bit as shown in Table 3.

TABLE 3

| first bit | second bit | what requested |
| --- | --- | --- |
| 0 | — | no coordination information requested |
| 1 | — | coordination information requested |
| — | 0 | preferred resource set requested |
| — | 1 | non-preferred resource set requested |

The 2 bits may be configured in the same field or may be configured in different fields. As another example, the UE may include information indicating whether coordination information may be received in the sidelink control information transmitted through the PSCCH. In other words, when the UE indicates that the coordination information may be received in the sidelink control information transmitted through the PSCCH, the second UE may transmit the coordination information indicating whether a conflict occurs when it conflicts or is expected to conflict with the sidelink radio resource reserved to be used by the UE.

As described above, the UE may request coordination information and indicate the resource type through various methods.

The configuration of the UE described above is described again below with reference to the drawings.

Figure 11:
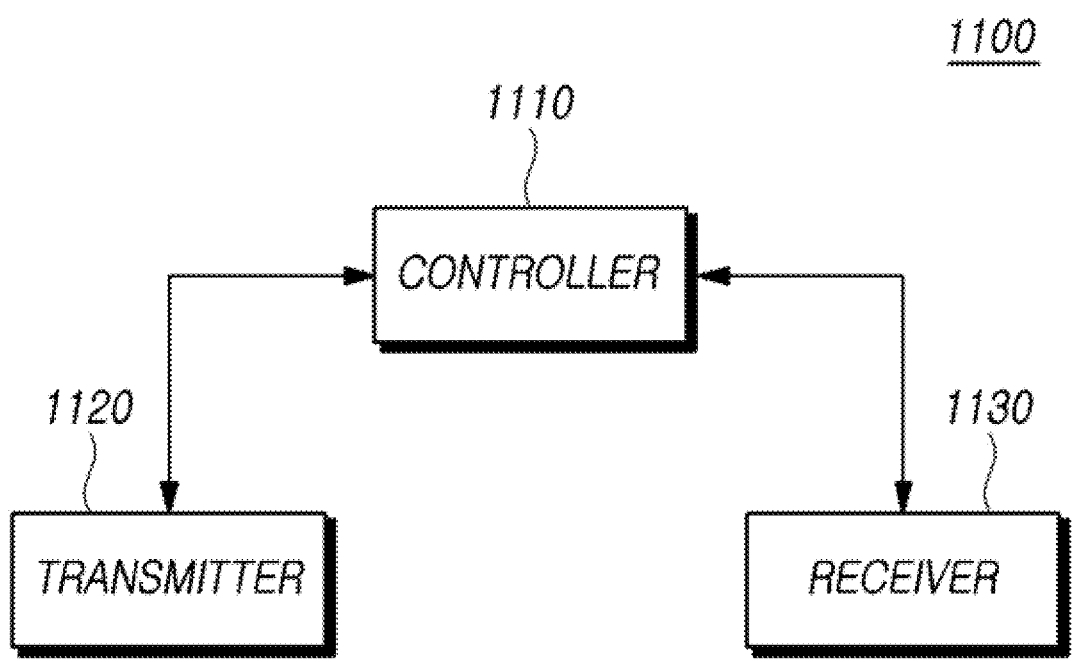
FIG. 11 is a view for describing a configuration of a UE according to an embodiment.

FIG. 11 is a view for describing a configuration of a UE according to an embodiment.

Referring to FIG. 11, a UE 1100 performing sidelink communication may include a transmitter 1120 transmitting, to a second UE, sidelink control information including request information for requesting coordination information and indication information indicating a resource type to be included in the coordination information, a receiver 1130 receiving the coordination information from the second UE, and a controller 1110 determining a resource for performing sidelink communication based on at least one of the coordination information and resource sensing information.

The UE 1100 may be configured to select a sidelink radio resource by receiving the coordination information through higher layer signaling. The higher layer signaling may be received from the base station and may be an RRC message. For example, whether to process coordination information of the UE may be indicated through disable or enable processing of a specific field in the RRC message.

The UE 1100 may request coordination information to select a resource for sidelink communication.

For example, the transmitter 1120 may include request information for requesting coordination information in the sidelink control information and transmit the same to the second UE. As another example, the transmitter 1120 may include the indication information for indicating the resource type to be included in the coordination information in the sidelink control information and transmit the same to the second UE. As another example, the transmitter 1120 may include both the request information and the indication information in the sidelink control information and transmit the same to the second UE.

For example, the sidelink control information including the request information and/or the indication information may be transmitted through a physical sidelink shared channel (PSSCH). The sidelink control information includes first sidelink control information included in the PSCCH and second sidelink control information included in the PSSCH. In this case, the above-described request information and/or indication information may be included in the second sidelink control information.

Specifically, the request information may indicate whether the UE requests coordination information.

For example, the request information may be indicated by a value of a first field composed of 1 bit included in the sidelink control information. The value of the first field may be used to identify whether the sidelink control information is for requesting coordination information or for providing coordination information. In other words, the first field is a field for identifying whether sidelink control information including request information is used to request coordination information or to include and provide coordination information. For example, if the value of the first field is set to '0', it may mean that the corresponding sidelink control information is for requesting coordination information, and another field and/or the value of the other field may be changed accordingly. If the value of the first field is set to '1', it may mean that the corresponding sidelink control information may include coordination information, and in this case, the coordination information may be additionally included. Of course, the values of the first field may be set to be opposite to each other.

As another example, the indication information may be indicated by a value of a second field composed of 1 bit distinguished from the first field included in the sidelink control information. For example, the second field may be included when the value of the first field is set to request coordination information. The second field may indicate which resource type the coordination information requested by the UE requests. For example, the second UE transmitting the coordination information may include the preferred resource information in the coordination information and transmit the same. Alternatively, the second UE may include the non-preferred resource information in the coordination information and transmit the same. Accordingly, in requesting the coordination information, the UE may designate which information (resource type) to request. In other words, the value of the second field may be used to indicate the resource type of any one of the preferred resource information and the non-preferred resource information determined by the second UE. If the value of the second field is set to '0', it may be interpreted that the UE requests to transmit the preferred resource information through the coordination information. Alternatively, if the value of the second field is set to '1', it may be interpreted that the UE requests to transmit the non-preferred resource information through the coordination information.

As described above, in requesting coordination information, the UE may also request a required resource type.

Meanwhile, when requesting the coordination information, the receiver 1130 may receive the coordination information from the second UE. The coordination information may be received through a PSSCH or a PSCCH. If the second UE receives the sidelink control information requesting the coordination information from the UE, the second UE may generate the preferred resource information or the non-preferred resource information in consideration of, e.g., the resource sensing result, the resource use information, etc. sensed by the second UE. Further, the second UE may generate any one of the preferred resource information and the non-preferred resource information based on the indication information received from the UE and transmit the same to the UE.

The receiver 1130 may receive preferred resource information or non-preferred resource information from the second UE through coordination information based on transmission of the sidelink control information including the request information and the indication information.

Meanwhile, the controller 1110 may determine a resource for performing sidelink communication based on the coordination information.

For example, the controller 1110 may select a resource for performing sidelink communication using at least one of coordination information and sensing result resource information sensed in the sensing window.

To select a sidelink radio resource, the controller 1110 selects a specific radio resource using a resource sensing result in a preset sensing window. As the resource sensing result, a channel measurement result such as RSRP for a specific frequency resource may be used.

Meanwhile, the UE according to the present embodiment may select the sidelink radio resource using both the sensing result resource information and the above-described coordination information.

As an example, the controller 1110 may select a resource commonly included in the sensing result resource information and the preferred resource information as the resource for performing the sidelink communication when the preferred resource information is included in the coordination information.

As another example, when the coordination information includes the preferred resource information, the controller 1110 may select a resource for performing sidelink communication from the preferred resource information without using the sensing result resource information.

As another example, the controller 1110 may select the resource for performing the sidelink communication except for a radio resource included in the non-preferred resource information from the sensing result resource information when the non-preferred resource information is included in the coordination information.

The above-described preferred resource information may include information about a radio resource preferred by the second UE to be used by the UE. The non-preferred resource information may include information about a radio resource that the second UE expects not to use by the UE.

Besides, the controller 1110 may control the operation of the UE 1100 required to perform the above-described embodiments.

Further, the transmitter 1120 and the receiver 1130 transmit/receive signals, data, and messages with the base station and another UE through a corresponding channel.

As such, when coordination information is received, the UE may select sidelink radio resources based on the sensing result resource information and coordination information. Through this operation, the UE may reduce the probability of communication problems due to resource conflicts even in an environment where multiple UEs perform sidelink communication. Further, by requesting coordination information and indicating a specific resource type as needed, unnecessary increases in system overhead may be prevented.

The above-described embodiments may be supported by the standard documents disclosed in IEEE 802, 3GPP, and 3GPP2 which are radio access systems. In other words, steps, components, and parts not described to clarify the technical spirit in the embodiments may be supported by the above-described standard documents. Further, all the terms disclosed in the disclosure may be described by the standard documents disclosed above.

The present embodiments described above may be implemented through various means. For example, the present embodiments may be implemented by various means, e.g., hardware, firmware, software, or a combination thereof.

When implemented in hardware, the method according to the present embodiments may be implemented by, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, the method according to the present embodiments may be implemented in the form of a device, procedure, or function performing the above-described functions or operations. The software code may be stored in a memory unit and driven by a processor. The memory unit may be positioned inside or outside the processor to exchange data with the processor by various known means.

The above-described terms, such as "system," "processor," "controller," "component," "module," "interface," "model," or "unit," described above may generally refer to computer-related entity hardware, a combination of hardware and software, software, or software being executed. For example, the above-described components may be, but are not limited to, processes driven by a processor, processors, controllers, control processors, entities, execution threads, programs, and/or computers. For example, both an application being executed by a controller or a processor and the controller or the processor may be the components. One or more components may reside within a process and/or thread of execution, and the components may be positioned in one device (e.g., a system, a computing device, etc.) or distributed in two or more devices.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the disclosure should be construed by the following claims, and all technical spirits within equivalents thereof should be interpreted to belong to the scope of the disclosure.

CROSS-REFERENCE TO RELATED APPLICATION

The instant patent application claims priority under 35 U.S.C. 119(a) to Korean Patent Application Nos. 10-2021-0126926 and 10-2022-0121299, filed on Sep. 27, 2021 and Sep. 26, 2022, respectively, in the Korean Intellectual Property Office, the disclosures of which are herein incorporated by reference in their entireties. The present patent application is also a continuation of PCT/KR2022/014436, filed on Sep. 27, 2022. The present patent application claims priority to other applications to be filed in other countries, the disclosures of which are also incorporated by reference herein in their entireties.

The invention claimed is:

1. A method for performing sidelink communication by a user equipment (UE), the method comprising:
    transmitting, to a second UE, sidelink control information including request information for requesting coordination information and indication information indicating a resource type to be included in the coordination information;
    receiving the coordination information from the second UE; and
    determining a resource for performing sidelink communication based on at least one of the coordination information and resource sensing information,
    wherein the request information is indicated by a value of a first field composed of one bit,
    wherein the indication information is indicated by a value of a second field composed of one bit distinguished from the first field,
    wherein the value of the first field is used to identify whether the sidelink control information is for requesting the coordination information or for providing the coordination information, and
    wherein the value of the second field is set when the value of the first field is set to request the coordination information.

2. The method of claim 1, wherein the sidelink control information is included and transmitted in a physical sidelink shared channel (PSSCH).

3. The method of claim 1, wherein the value of the second field is used to indicate the resource type of any one of preferred resource information and non-preferred resource information determined by the second UE.

4. The method of claim 1, wherein determining the resource includes selecting a resource for performing the sidelink communication using at least one of the coordination information and sensing result resource information sensed in a sensing window.

5. The method of claim 4, wherein determining the resource includes selecting a resource commonly included in the sensing result resource information and preferred resource information as the resource for performing the sidelink communication when the preferred resource information is included in the coordination information.

6. The method of claim 4, wherein determining the resource includes selecting the resource for performing the sidelink communication except for a radio resource included in non-preferred resource information from the sensing result resource information when the non-preferred resource information is included in the coordination information.

7. A user equipment (UE) performing sidelink communication, comprising:
    a transmitter transmitting, to a second UE, sidelink control information including request information for requesting coordination information and indication information indicating a resource type to be included in the coordination information;
    a receiver receiving the coordination information from the second UE; and
    a controller determining a resource for performing sidelink communication based on at least one of the coordination information and resource sensing information,
    wherein the request information is indicated by a value of a first field composed of one bit,
    wherein the indication information is indicated by a value of a second field composed of one bit distinguished from the first field,
    wherein the value of the first field is used to identify whether the sidelink control information is for requesting the coordination information or for providing the coordination information, and
    wherein the value of the second field is set when the value of the first field is set to request the coordination information.

8. The UE of claim 7, wherein the sidelink control information is included and transmitted in a physical sidelink shared channel (PSSCH).

9. The UE of claim 7, wherein the value of the second field is used to indicate the resource type of any one of preferred resource information and non-preferred resource information determined by the second UE.

10. The UE of claim 7, wherein the controller selects a resource for performing the sidelink communication using at least one of the coordination information and sensing result resource information sensed in a sensing window.

* * * * *